US007359789B2

(12) United States Patent
Hackel et al.

(10) Patent No.: US 7,359,789 B2
(45) Date of Patent: Apr. 15, 2008

(54) CONTROL SYSTEM FOR AN INTERNAL COMBUSTION ENGINE AND A VEHICLE HAVING THE SAME

(75) Inventors: Vincent Hackel, Fenton, MI (US); Claus Schnabel, Fenton, MI (US); David Zevchak, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 421 days.

(21) Appl. No.: 10/978,952

(22) Filed: Nov. 1, 2004

(65) Prior Publication Data

US 2006/0095165 A1 May 4, 2006

(51) Int. Cl.
*G06F 19/00* (2006.01)
*G06F 7/00* (2006.01)
*G06G 7/70* (2006.01)

(52) U.S. Cl. .......................... 701/101; 701/102; 701/1; 123/612; 123/617; 324/207.13

(58) Field of Classification Search .................... 701/1, 701/101-102; 123/612, 617; 324/207.13
See application file for complete search history.

(56) References Cited

U.S. PATENT DOCUMENTS 4,178,793 A 12/1979 Bremer et al.
4,292,945 A * 10/1981 Kiesling .................... 123/438
4,505,249 A * 3/1985 Young ........................ 123/527
4,509,483 A * 4/1985 Johnson ...................... 123/672
4,597,364 A * 7/1986 Young ................... 123/27 GE
5,005,142 A 4/1991 Lipchak et al.
5,154,246 A 10/1992 DiGiulio et al.
5,178,224 A 1/1993 DiGiulio et al.
5,267,542 A * 12/1993 Keskula ................. 123/406.65
5,477,827 A * 12/1995 Weisman et al. ........... 123/436
5,638,305 A * 6/1997 Kobayashi et al. ......... 700/280
5,652,911 A 7/1997 Van Venrooy
5,912,821 A * 6/1999 Kobayashi .................. 700/280

(Continued)

OTHER PUBLICATIONS

Electric drive subsystem for a low-storage requirement hybrid electric vehicle, Miller, J.M.; Gale, A.R.; Anand Sankaran, V.; Vehicular Technology, IEEE Transactions on, vol. 48, Issue 6, Nov. 1999 pp. 1788-1796, Digital Object Identifier 10.1109/25.806771.*

(Continued)

*Primary Examiner*—Cuong Nguyen
(74) *Attorney, Agent, or Firm*—Michael Best & Friedrich LLP

(57) ABSTRACT

The invention provides a control system for an internal combustion engine of a vehicle. The control system includes a sensor controller and an engine controller. The sensor controller includes a first interface configured to be connected to a sensor coupled to the engine, a first one or more components to provide power regulation and electromagnetic compatibility for the sensor controller, a second interface configured to be connected to a local communication bus of the vehicle, and a first processor and memory configurable to provide control and diagnostics of the sensor. The engine controller includes a third interface configured to be connected to the local communication bus, a second one or more components to provide power regulation and electromagnetic compatibility for the engine controller, and a second processor and memory configurable to control at least one aspect of the internal combustion engine based on information from the sensor controller.

7 Claims, 3 Drawing Sheets

U.S. PATENT DOCUMENTS

| | | | | |
|---|---|---|---|---|
| 6,032,109 | A | 2/2000 | Ritmiller, III | |
| 6,082,102 | A * | 7/2000 | Wissler et al. | 60/286 |
| 6,265,840 | B1 * | 7/2001 | Wiezorek et al. | 318/434 |
| 6,330,499 | B1 | 12/2001 | Chou et al. | |
| 6,407,543 | B1 * | 6/2002 | Hagio et al. | 324/207.25 |
| 6,468,478 | B1 | 10/2002 | Honda | |
| 6,484,080 | B2 | 11/2002 | Breed | |
| 6,584,432 | B1 | 6/2003 | Holzinger et al. | |
| 6,609,076 | B2 | 8/2003 | Schuh et al. | |
| 6,711,932 | B2 | 3/2004 | Iwazaki et al. | |
| 6,732,503 | B2 * | 5/2004 | Harima et al. | 60/276 |
| 6,737,954 | B2 | 5/2004 | Chainer et al. | |
| 6,738,697 | B2 | 5/2004 | Breed | |
| 6,756,780 | B2 * | 6/2004 | Hagio et al. | 324/207.25 |
| 6,819,102 | B2 * | 11/2004 | Hagio et al. | 324/207.25 |
| 6,997,051 | B2 * | 2/2006 | Okazaki et al. | 73/204.22 |
| 7,212,388 | B2 * | 5/2007 | Wizemann et al. | 361/91.1 |
| 2002/0130656 | A1 * | 9/2002 | Hagio et al. | 324/207.2 |
| 2003/0061801 | A1 * | 4/2003 | Harima et al. | 60/276 |
| 2004/0020480 | A1 * | 2/2004 | Kreikemeier et al. | 123/683 |
| 2004/0050155 | A1 * | 3/2004 | Okazaki et al. | 73/204.22 |
| 2004/0135574 | A1 * | 7/2004 | Hagio et al. | 324/207.25 |
| 2004/0252437 | A1 * | 12/2004 | Wizemann et al. | 361/119 |
| 2006/0095165 | A1 * | 5/2006 | Hackel et al. | 701/1 |

OTHER PUBLICATIONS

CAN-LabView based development platform for fine-tuning hybrid vehicle management systems, Ceraolo, M.; Capozzella, P.; Baronti, F.; Vehicle Power and Propulsion, 2005 IEEE Conference, Sep. 7-9, 2005 p. 6 pp., Digital Object Identifier 10.1109/VPPC.2005.1554594 ,.*

EMI model improvement taking LSI package structure ino consideration, Ichikawa, K.; Unou, T.; Tsuda, T.; Mabuchi, Y.; Nagata, M.; Electromagnetic Compatibility, 2006. EMC 2006. 2006 IEEE International Symposium on, vol. 3, Aug. 14-18, 2006 pp. 707-711.*

On the Feasibility of the Brushless DC (BLDC) Motor and Controller for 42V Automotive Cooling Fan System,Choi, Jun-Hyuk; Jung, In-Sung; Hur, Jin; Sung, Ha-Gyeong; Lee, Byoung-Kuk;Electric Machines & Drives Conference, 2007. IEMDC '07. IEEE International,vol. 2, May 3-5, 2007 pp. 1349-1354, Digital Object Identifier 10.1109/EMDC.2007.38362.*

The Space Technology 8 mission, Franklin, S.; Jentung Ku; Spence, B., McEachen, M.; White, S.; Samson, J.; Some, R.; Zsoldos, J.; Aerospace Conference, 2006 IEEE, Mar. 4-11, 2006 p. 16 pp., Digital Object Identifier 10.1109/AERO.2006.1655767.*

Status of automotive electronics in the USA, Rivard, J.G.; Vehicular Technology Conference, 1980. 30th IEEE□□vol. 30, Sep. 15-17, 1980 pp. 21-31 □□.*

2003 cumulative bibliography of articles on semiconductor thermal measurement, management and modeling, Siegal, B.S.; Semiconductor Thermal Measurement and Management Symposium, 2003. Ninteenth Annual IEEE, Mar. 11-13, 2003 pp. 369-404, Digital Object Identifier 10.1109/STHERM.2003.1194387.*

The 1998 IEEE Industry Applications Conference, Industry Applications Conference, 1998. Thirty-Third IAS Annual Meeting. The 1998 IEEE, vol. 2, Oct. 12-15, 1998, pp. i-xxx □□.*

* cited by examiner

CONTROL SYSTEM FOR AN INTERNAL COMBUSTION ENGINE AND A VEHICLE HAVING THE SAME

FIELD OF THE INVENTION

Embodiments of the invention generally relate to control units used to monitor or control internal combustion engines of a vehicle. Certain embodiments relate to exhaust control units that can be used with existing engine control units.

BACKGROUND OF THE INVENTION

A wide variety of electronics including electronic control units ("ECUs") and computers are used to control and monitor modern internal combustion engines. Fuel delivery (for example, fuel injection), air intake, exhaust flow, and engine temperature are just some of the things that are controlled or monitored electronically. Many engine manufacturers develop and/or manufacture their own electronics. Therefore, control devices from one manufacturer are often not compatible with the electronics of a different manufacturer.

SUMMARY OF THE INVENTION

There is a need for improved control devices that are compatible with the control electronics made by different manufactures. In addition there is a need for specific purpose control devices of one manufacturer to be compatible with more general-purpose control electronics from a different manufacturer. For example, due to the type of internal combustion engine at hand (for example, diesel, gasoline, car, truck, etc.) an engine manufacture may develop its own specialized engine controller, particularly when the manufacturer has specialized know-how related to a particular engine type. However, that same engine manufacturer may desire to use other peripheral electronics (for example, electronics for transmission, suspension, and brake systems) and sensors (for example, manifold sensors, oxygen or exhaust sensors, temperature sensors, speed sensors, etc.) from other manufacturers, in order to avoid the costs associated with development of the same In one embodiment, the invention provides a vehicle including an internal combustion engine and an engine management system (EMS) to monitor and control the operation of the engine. The EMS includes a sensor coupled to the engine, a sensor controller connected to the sensor, an automotive communication bus connected to the sensor controller, and an engine controller connected to the automotive communication bus. The sensor controller includes a first microcontroller and a first transceiver connected to the automotive communication bus. The sensor controller is configured to provide control and diagnostics of the sensor for acquiring sensed information. The engine controller includes a second microcontroller and a second transceiver connected to the automotive communication bus. The engine controller is configured to control or monitor at least one aspect of the engine based on the sensed information.

In another embodiment, the invention provides a control system for an internal combustion engine of a vehicle. The control system includes a sensor controller and an engine controller. The sensor controller includes a first interface configured to be connected to a sensor coupled to the engine, a first one or more components to provide power regulation and electromagnetic compatibility for the sensor controller, a second interface configured to be connected to a local communication bus of the vehicle, and a first processor and memory configurable to provide control and diagnostics of the sensor. The engine controller includes a third interface configured to be connected to the local communication bus, a second one or more components to provide power regulation and electromagnetic compatibility for the engine controller, and a second processor and memory configurable to control at least one aspect of the internal combustion engine based on information from the sensor controller.

Additional advantages and aspects of embodiments of the invention are illustrated in the drawings and provided in the subsequent description.

DETAILED DESCRIPTION

Figure 1:
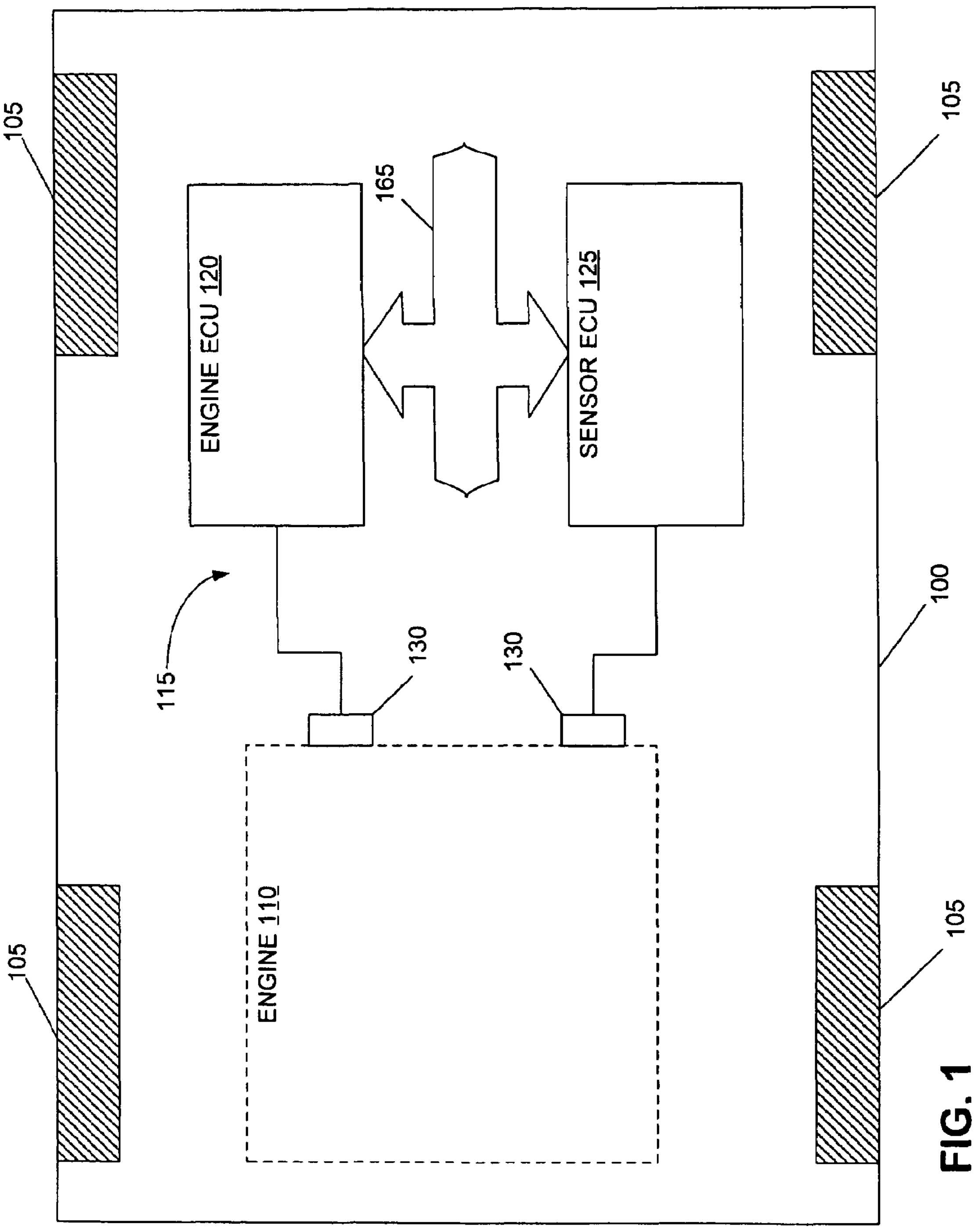
FIG. 1 illustrates an exemplary vehicle with an internal combustion engine.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," "supported," and "coupled" are used broadly and encompass both direct and indirect mountings, connections, supports, and couplings. Further, "connected" and "coupled" are not restricted to physical or mechanical connections or couplings.

FIG. 1 illustrates an exemplary vehicle 100 embodying the invention. The vehicle 100 includes a set of wheels 105 and a power plant (e.g., an internal combustion engine, a hybrid engine, a fuel cell, etc). For the construction shown in FIG. 1, the power plant includes an internal combustion engine 110. The engine 110 drives the wheels 105, typically via a transmission or similar mechanical power transfer means.

As further shown in FIG. 1, the vehicle also includes an engine management system (EMS) 115, which may be part of or separate from a vehicle management system (VMS). The EMS can include a plurality of controllers referred to herein as electronic control units (ECUs). For example and in the construction shown in FIG. 1, the EMS includes an engine ECU 120 and a sensor ECU 125. Generally speaking, the engine ECU 120 receives inputs (for example, acquired signals, data, logic commands, etc., all of which may be referred to herein as "input information" or simply "inputs"); processes the inputs to provide, among other things, engine 110 monitoring and management (for example, to meet performance, economy, and emissions standards); and generates one or more outputs (for example, activation signals, data, logic commands, etc., all of which may be referred to herein as "output information" or simply "outputs"). Before proceeding further, it should be noted that the engine ECU 120 can control other aspects or components of the vehicle 100. For example, the engine ECU 120 can also act as or combine with a transmission ECU that controls the vehicle transmission.

Figure 2:
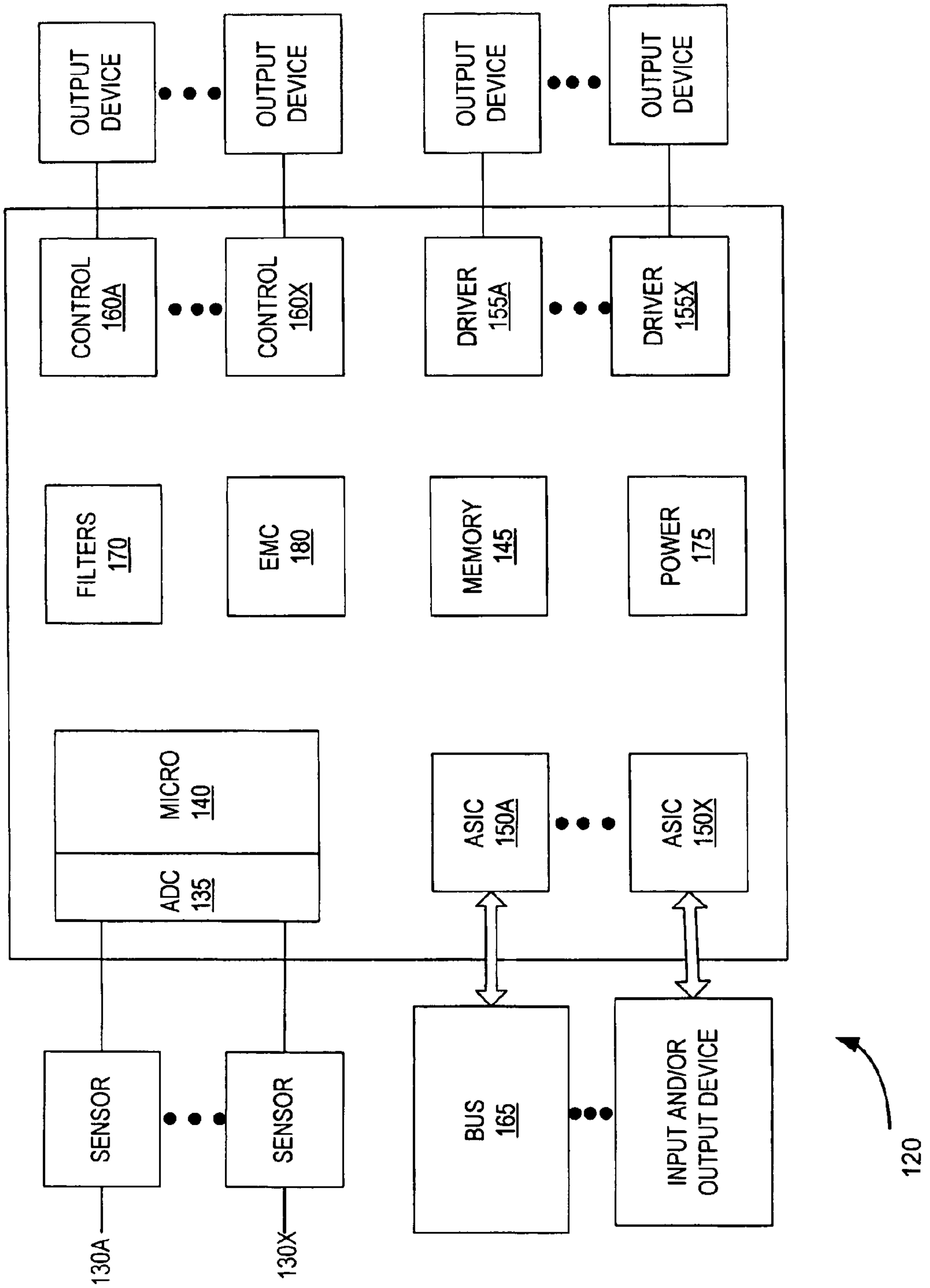
FIG. 2 illustrates additional details of the engine controller illustrated in FIG. 1.

One construction of an engine ECU 120 is shown in FIG. 2. The engine ECU 120 includes a number of sensors 130, an analog-to-digital converter (ADC) 135, a microcontroller 140, memory 145, one or more application-specific integrated circuits (ASICs) 150, driver circuitry 155, and control circuitry 160. For example, the engine ECU 120 can include temperature sensors, rpm or speed sensors, oxygen sensors, etc.; the memory 145 can include RAM, flash EPROM, and EEPROM, etc.; the driver circuitry 155 can include relays or switches to control a plurality of fuel injectors, a throttle, a fuel pump, an AC compressor, a camshaft control, a secondary air pump, an EGR valve, a canister purge valve, a manifold switch, etc.; and the control circuitry 160 can include switches (for example, electronic switches such as transistors) to control a plurality of spark plugs. The ASICs 150 are integrated circuits designed to perform a particular function by defining the interconnection of a set of basic circuit building blocks. For example, the engine ECU 120 includes an ASIC 150A (for example, a Philips manufactured high speed CAN transceiver, model no. IC_TJA1040T_SO8) acting as a transceiver for communicating data over an automotive communication bus 165 (discussed below). The engine ECU 120 can include other ASICs 150, such as one or more ASICs 150 for communicating input/output information to/from one or more other sensors or other input/output devices. The microcontroller 140 includes a microprocessor or CPU to receive, interpret, and execute instructions. The microcontroller 140 executes the instructions to receive one or more inputs, process the inputs, and provide one or more outputs. For example, the microcontroller 140 processes the inputs to provide outputs for controlling the operation of the engine 110. The microcontroller 140 can include other components, such as RAM, PROM, timers, I/O ports, etc. Before proceeding further, it should be understood that the engine ECU 120 can include other elements (for example, filter circuitry 120, power regulators 175, electromagnetic compatibility (EMC) circuitry 180, etc.) and not all the components shown in FIG. 2 are required for all constructions.

The engine ECU 120 communicates with other ECUs over the automotive communication bus 165. An example bus 165 capable of being used with the vehicle 100 is the SAE J1939 Controller Area Network (CAN).

Figure 3:
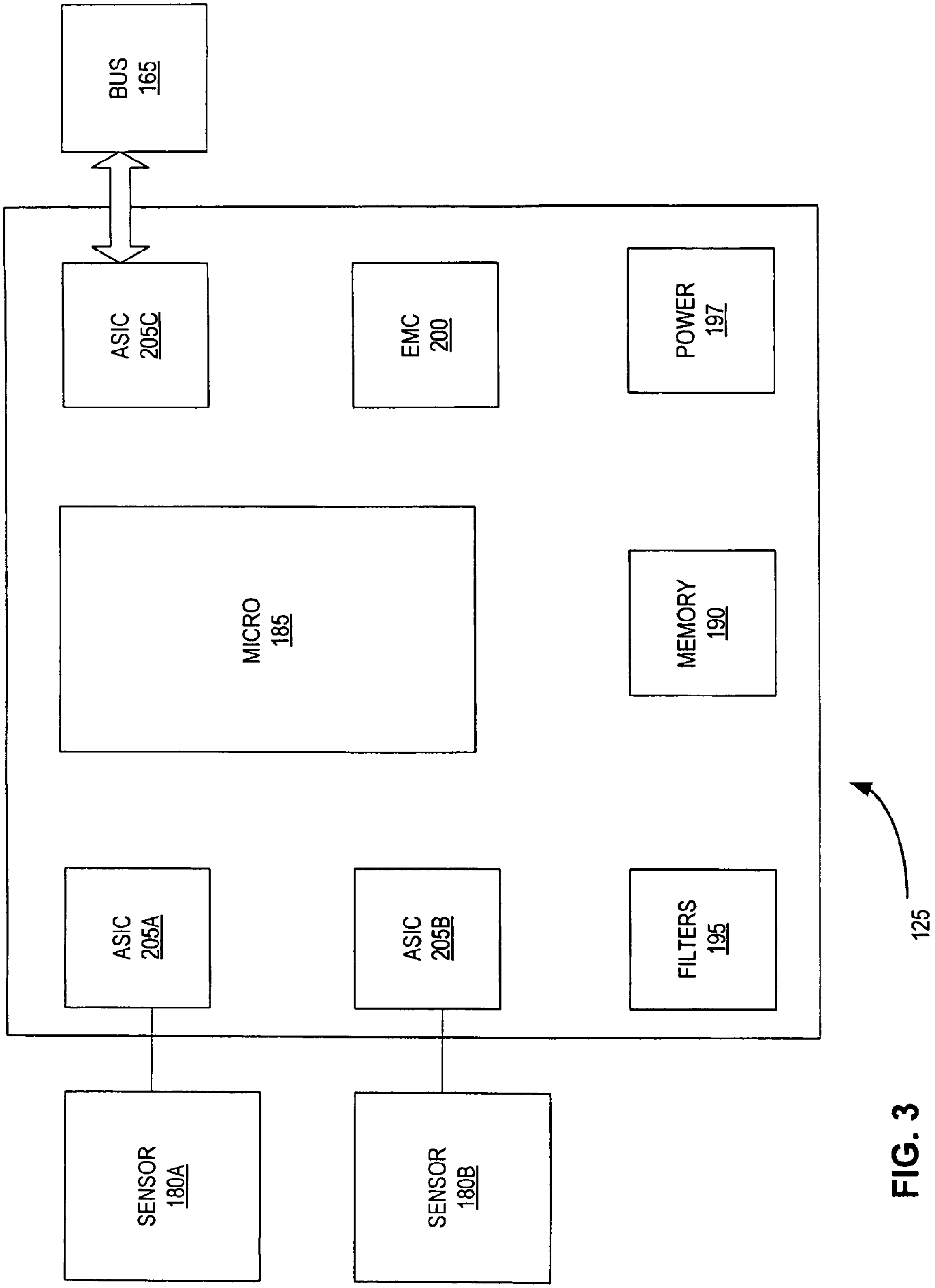
FIG. 3 illustrates additional details of the sensor controller illustrated in FIG. 1.

As shown in FIG. 1, the EMS 115 includes a sensor ECU 125. While only one sensor ECU 125 is shown in FIG. 1, the EMS 115 can include a plurality of sensor ECUs 125. In one construction and as shown in FIG. 3, the sensor ECU 125 is in communication with a plurality of wide-band oxygen sensors 180. Before proceeding further, it should be understood that the sensor ECU 125 can be in communication with other sensors in place of, or in addition to, the wide-band oxygen sensors 180. Also as shown in FIG. 3, the sensor ECU 125 includes a microcontroller 185, memory 190 (e.g., RAM, flash EPROM, and EEPROM), filter circuitry 195, EMC circuitry 200, and a plurality of ASICs 205. Example ASICs include oxygen sensor ASICs 205A and 205B, model no. Bosch_CJ125_ASIC, which are used to acquire information from the wide-band oxygen sensors 180A and 180B. The ASICs 205A and 205B provide the information to the microcontroller 185. ASIC 205C, in one construction, is used to allow communication between the sensor ECU 125 and the engine ECU 120 via the bus 165. Similar to the engine ECU 120, the microcontroller 185 includes a microprocessor or CPU to receive, interpret, and execute instructions. An example microcontroller is a Motorola manufactured microcontroller, model no. MC68HC908GZ48. The microcontroller 185 executes the instructions to receive one or more inputs, process the inputs, and provide one or more outputs. For example, the microcontroller 185 processes the inputs to provide an output indicating an amount of oxygen in the exhaust gas. The microcontroller 185 can include other components, such as RAM, PROM, timers, I/O ports, etc. Before proceeding further, it should be understood that the sensor ECU 125 can include other elements (for example, filter circuitry 195, power regulators 197, EMC circuitry 200, etc.) and not all the components shown in FIG. 3 are required for all constructions.

During operation, the EMS 115 monitors and controls, among other things, the operation of the engine 110. While monitoring the engine 110, the engine ECU 115 receives input information from a plurality of sources, including the sensor ECU 125. For the construction shown in FIGS. 1-3, the sensor ECU 125 monitors the amount of oxygen in the exhaust gas and provides data to the engine ECU 120 over the bus 165. The engine ECU 120 uses the information as part of its control of the engine 120.

Therefore, the invention provides a new and useful control system for an internal combustion engine and a vehicle having the same. Various features and aspects of the invention are set forth in the following claims.

The invention claimed is:

1. A control system for an internal combustion engine of a vehicle, the control system comprising:
- a sensor controller including
  - a first interface transceiver configured to be connected to a sensor coupled to the engine,
  - one or more components to provide power regulation and electromagnetic compatibility for the sensor controller,
  - a second interface transceiver configured to be connected to a local communication bus of the vehicle, and
  - a first processor configured to provide control and diagnostics of the sensor; and
- an engine controller including
  - a bus interface transceiver configured to be connected to the local communication bus,
  - one or more components to provide power regulation and electromagnetic compatibility for the engine controller, and
  - a second processor configured to control at least one aspect of the internal combustion engine based on information from the bus interface transceiver.

2. A control system as set forth in claim 1 wherein the sensor controller comprises a power regulator and electromagnetic compatibility circuitry.

3. A control system as set forth in claim 2 wherein the engine controller comprises a power regulator and electromagnetic compatibility circuitry.

4. A control system as set forth in claim 1 wherein the sensor comprises an oxygen sensor.

5. A control system as set forth in claim 1 wherein the sensor comprises a wide-band oxygen sensor.

6. The control system of claim 1, comprising:
- a second sensor coupled to the engine controller, and wherein the engine controller is configured to control or monitor at least one aspect of the engine based on information sensed by the second sensor.

7. A control system as set forth in claim 1 wherein the first sensor controller further comprises a power regulator, and a filter.

* * * * *